(No Model.)

P. HARDEGEN.
MICROPHONE.

No. 575,887. Patented Jan. 26, 1897.

Witnesses
H. van Oldenneel
E. A. Scott

Inventor
Paul Hardegen
by Richards
Attorneys

UNITED STATES PATENT OFFICE.

PAUL HARDEGEN, OF BERLIN, GERMANY.

MICROPHONE.

SPECIFICATION forming part of Letters Patent No. 575,887, dated January 26, 1897.

Application filed May 28, 1896. Serial No. 593,440. (No model.)

*To all whom it may concern:*

Be it known that I, PAUL HARDEGEN, a subject of the King of Prussia, German Emperor, residing at Berlin, in the German Empire, have invented certain new and useful Improvements in Microphones, of which the following is a specification.

This invention relates to improvements in microphones; and it consists of a flexible soft non-conducting body between the membrane of the microphone and one electrode in such a manner that without preventing in the least the vibration of the membrane an independent vertical and horizontal vibration of the electrode flexibly connected with or depending from said membrane will be produced and a greater mobility of the coal-dust or the like between the membrane and the electrode, whereby a sticking together or the like of said coal-dust will be prevented and a better reproduction of the sounds will be obtained.

The invention is illustrated in the accompanying drawings, in which—

Figure 1:
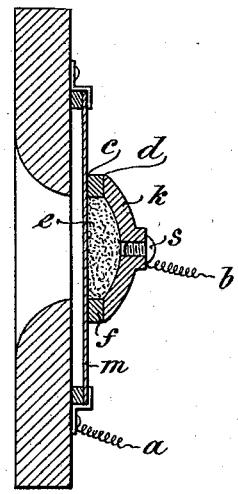
Figure 2:
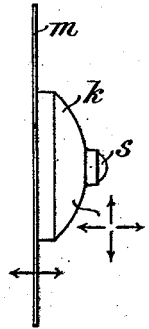
Figure 3:
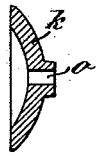

Figure 1 is a longitudinal section thereof; while Fig. 2 shows by the arrows the direction in which the flexibly-connected membrane and electrode can vibrate; Fig. 3, a longitudinal section of an electrode used in the device. The arrangement of the membrane or of the electrode or of the coal-dust or the like is no part of this invention, as these are well known already.

A membrane $m$, Fig. 1, carries in its center a body $K$ of some conducting material (as, for instance, carbon, metal, &c.) through the intermediary of a non-conducting flexible or soft body $f$, (for instance, soft felt, wool, cotton, or the like.) This body $f$ is fixed at $c$ and $d$ to the membrane $m$ and to the body $K$ by means of a suitable sticking matter, (shellac, gum, isinglass, fish-glue, or the like.) The body $K$ is provided with an opening $O$, Fig. 3, through which the well-known particles (coal-dust, fibers, dust, coal-balls, metal or metallic bodies) are introduced and whose quantity is thus regulated, so that they cannot prevent the vibrating of the membrane $m$ and of the body $K$. The opening $o$ can be closed, for instance, by a screw which serves at the same time for conveying into or letting out (see $b$) the electric current. The membrane is connected in the well-known manner with a generator of electricity by means of the wire $a$, for instance.

The described flexible mounting of the body or of the electrode $K$ upon the membrane $m$, Fig. 2, permits vibrations of the electrode in all directions, which was impossible hitherto, as shown, as an instance, by the arrows in Fig. 2. The fact that this flexible mounting of the body $K$ upon the membrane $m$ produces the highest and most varying vibrations of both said parts $m$ and $K$ and of the intermediate soft and flexible part $f$ renders it impossible for the coal-dust, metallic particles, or the like between the membrane and the electrode to combine or to settle, partly because this filling $e$ can move freely and partly because the filling substance is constantly stirred and cannot stick in any manner, but is compelled to move in a certain circle. Aside from the advantages of this arrangement it can also be said that it renders the sound most exactly not only as to power, but also as to its nature.

I claim—

In combination in a microphone, the vibrating diaphragm, the electrode and the connection between the electrode and the diaphragm consisting of the flexible ring of material forming with said electrode and diaphragm a chamber for the granular material and serving to support the electrode on the plate to permit vibration of the same, substantially as described.

In witness whereof I have hereunto signed my name in the presence of two subscribing witnesses.

PAUL HARDEGEN.

Witnesses:
W. HAUPT,
HENRY HASPER.